US007231051B2

(12) United States Patent
Paviot et al.

(10) Patent No.: US 7,231,051 B2
(45) Date of Patent: Jun. 12, 2007

(54) DETECTION OF VIEWING DIRECTION BY MICROPHONE

(75) Inventors: Florent Paviot, Tevoux (FR); Siegfried Rothe, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 295 days.

(21) Appl. No.: 10/414,973

(22) Filed: Apr. 16, 2003

(65) Prior Publication Data

US 2003/0228036 A1   Dec. 11, 2003

(30) Foreign Application Priority Data

Apr. 17, 2002 (DE) ................. 102 17 822

(51) Int. Cl.
*H04R 29/00* (2006.01)
(52) U.S. Cl. .............. 381/56; 340/576; 340/439; 381/92; 381/86
(58) Field of Classification Search ............. 381/92, 381/86; 340/439, 575, 576, 436
See application file for complete search history.

(56) References Cited

U.S. PATENT DOCUMENTS

| 4,279,027 | A |   | 7/1981 | Van Sloun ............ 367/125 |
| 5,862,240 | A | * | 1/1999 | Ohkubo et al. ......... 381/92 |
| 6,219,645 | B1 | * | 4/2001 | Byers .................. 704/275 |
| 6,469,732 | B1 | * | 10/2002 | Chang et al. ........... 381/92 |
| 6,575,902 | B1 | * | 6/2003 | Burton ................. 340/575 |
| 6,748,088 | B1 | * | 6/2004 | Schaaf ................. 381/92 |
| 2001/0029416 | A1 |   | 10/2001 | Breed et al. ............ 701/45 |
| 2002/0069054 | A1 | * | 6/2002 | Arrowood et al. ....... 704/233 |

FOREIGN PATENT DOCUMENTS

| DE | 34 47 842   | 7/1974 |
| DE | 38 43 034   | 6/1990 |
| DE | 19734307    | 2/1999 |
| DE | 199 38 171  | 3/2001 |
| DE | 19952857    | 8/2001 |
| DE | 10013432    | 9/2001 |
| DE | 101 60 843  | 7/2003 |

* cited by examiner

*Primary Examiner*—Brian T. Pendleton
(74) *Attorney, Agent, or Firm*—Davidson, Davidson & Kappel, LLC

(57) ABSTRACT

A method for detecting of a viewing direction of a person includes sensing a speech signal originating from the person using at least one direction-selective microphone so as to produce a microphone signal, detecting the speaking direction of the person using the microphone signal, and deriving the viewing direction from the speaking direction. Also, a device that includes at least one direction-selective microphone configured to detect a speaking direction of the person using speech signals, and a processing unit configured to process the speech signals so as to determine the viewing direction of the person.

26 Claims, 1 Drawing Sheet

DETECTION OF VIEWING DIRECTION BY MICROPHONE

Priority is claimed to German Patent Application No. DE 102 17 822.4-35, filed on Apr. 17, 2002, which is incorporated by reference herein.

BACKGROUND

The present invention relates to a method and device for the detection of a viewing direction of a person, in particular a driver of a vehicle.

In order to increase vehicle safety and vehicle comfort, modern motor vehicles increasingly have adaptive warning systems and information systems as well as backup systems which are capable of autonomously performing functions in the field of vehicle guidance on the basis of the current traffic situation and the state of a driver of the vehicle.

For example, German Patent Document No. DE 197 34 307 C2 discloses a device for monitoring and/or influencing the driving behaviour of a driver of a vehicle, which device generates a warning signal or acts on the steering as a function of whether the driver's viewing direction deviates from the direction of travel. The viewing direction of the driver of the vehicle is determined here using a camera, with the disadvantage that it is difficult to evaluate the camera signals in particular in the dark or when the sun is low in the sky.

In order to be able to observe a driver of a vehicle by means of a camera system irrespective of the current lighting situation, in particular at night, German Patent Application No. DE 101 60 843 A1, which was published at a later date than the present application, describes a lighting means for recording images in order to detect patterns in motor vehicles, which illuminates the vehicle occupants actively with infrared light. In order to avoid the driver of a vehicle being dazzled, it is not possible to use visible light for the illumination so that, in order to record images, it is also necessary to use a separate camera system which operates in the invisible wavelength range.

SUMMARY OF THE INVENTION

An object of the present invention is to provide a method and a device, suitable for carrying out the method, for the detection of the viewing direction of persons, in particular of vehicle drivers, which can operate independently of the currently prevailing lighting conditions and without recourse to an active lighting device.

The present invention provides a method for the detection of a viewing direction of a person, in particular a driver of a vehicle, characterized in that the viewing direction is derived from the speaking direction of the speaking person, assuming that the speaking direction corresponds essentially to the viewing direction, in which case, in order to detect the speaking direction of the person, the speech signals originating from said person are sensed by means of at least one direction-selective microphone, and the speaking direction is determined from the resulting microphone signal.

The present invention also provides a device for the detection of the viewing direction of a person, in particular of a driver of a vehicle, characterized in that the device comprises at least one direction-selective microphone by means of which the speaking direction of the person can be detected by reference to speech signals, and in that the device includes a unit for processing the speech signals and for determining the viewing direction of the person.

Advantageous refinements and developments of the present invention are described in the specification and the claims.

In the present invention, the speaking direction of a person is detected in a particularly advantageous manner by at least one direction-selective microphone, and the person's viewing direction is determined therefrom. The possibility of determining the viewing direction of a speaker from the detected speaking direction is provided for most situations which occur in reality as when a speaker is speaking to someone he also generally looks at them or at least tends to look essentially in the direction in which the person is located. In practice, it is therefore generally perfectly possible to assume that the speaking direction essentially corresponds to the viewing direction.

BRIEF DESCRIPTION OF THE DRAWING

The present invention will be described below in detail by means of exemplary embodiments and with reference to the drawing, in which.

DETAILED DESCRIPTION

Figure 1:
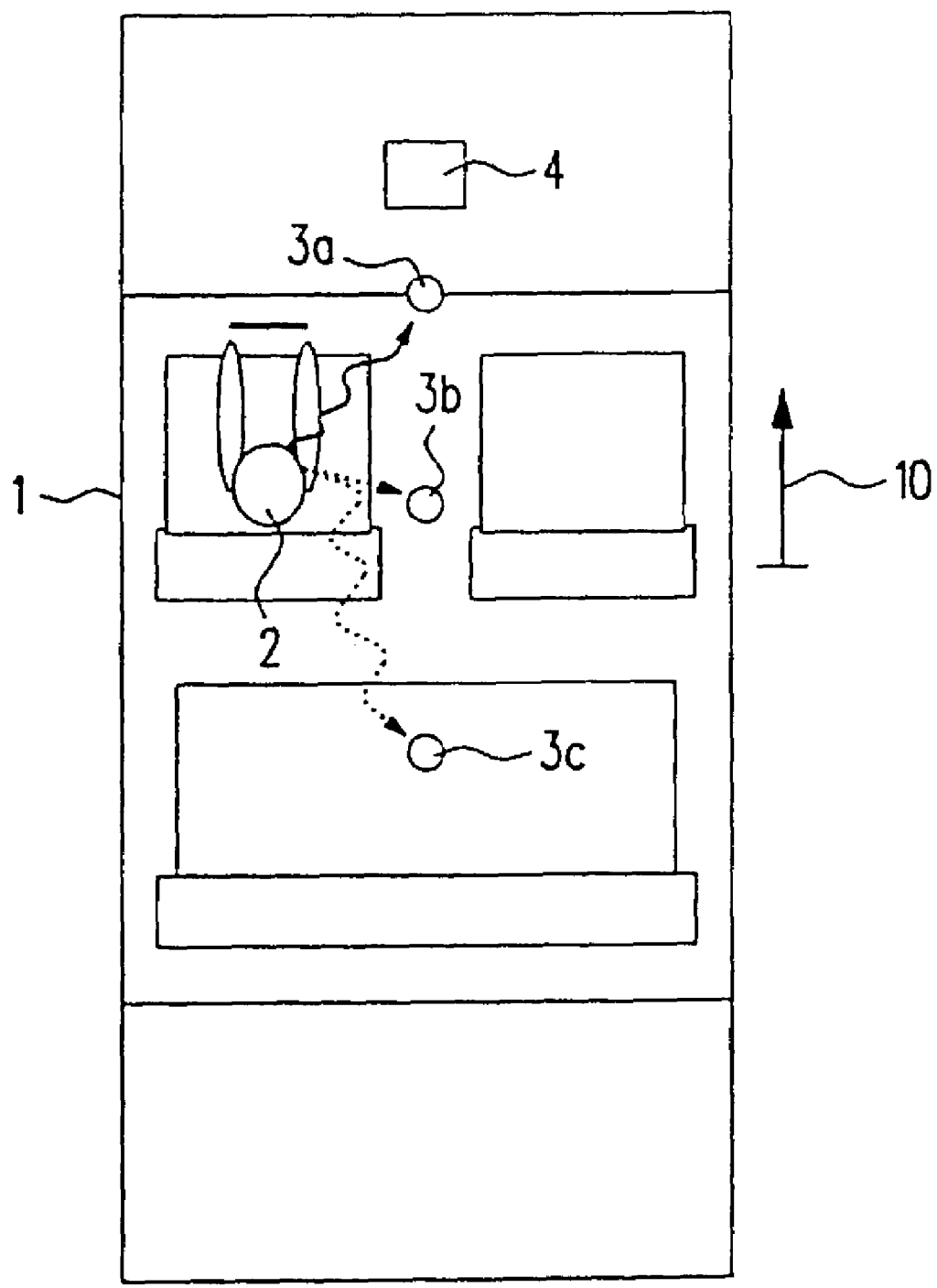
FIG. 1 is a schematic view of a possible way of implementing the device according to the present invention for detecting the viewing direction in a motor vehicle.

The direction-selective microphone within the scope of the present invention may be either an individual microphone or a microphone array which is formed from a multiplicity of individual microphones connected to one another.

By way of example, reference will be made here to the German Patent Document No. DE 38 43 034 C2 which discloses a microphone system, composed of a single microphone, for determining the direction of a sound source, or to German Patent Document No. DE 34 47 842 A1 which describes a microphone array for determining the direction of incidence of sound waves, composed of a multiplicity of electro-acoustic transducers. Both German Patent Document No. DE 38 43 034 C2 and German Patent Document No. DE 34 47 842 A1, are incorporated by reference herein.

An exemplary arrangement of the device according to the present invention in a motor vehicle for determining the viewing direction of the driver (2) of the vehicle is shown in the FIG. 1. Here, a driver (2) of a vehicle is seated on the driver's seat of a motor vehicle (1), in whose interior three microphones (3a, 3b, 3c) which interact as a microphone array along the longitudinal axis of the motor vehicle pick up the sound waves (illustrated as arrows) which originate from the driver. The microphone array is connected to a unit for processing the speech signals (4), in which the signals of the microphone array are evaluated according to the present invention. If the driver is looking in the travel direction (10) of the vehicle (straight ahead) as in the example illustrated in the figure, the speech signal originating from him is received most strongly by the microphone (3a) and most weakly by the microphone (3c). The signal intensity which is measured by microphone (3b) should be only slightly less than the signal intensity of the signal measured at microphone (3a) as although it is at a less favourable angle with respect to the vehicle driver (signal source) it is at a significantly smaller distance. In the situation, frequently occurring when operating a vehicle, in which the vehicle driver turns to face his front seat passenger or an electronic device located in the centre console of the vehicle, the ratio of the signal levels measured at the microphones (3a) and (3b) with respect to one another changes significantly in comparison with the situation in which the driver looks straight ahead. The signal levels of the individual microphones (3a–c) change even more significantly with respect to one another if the driver turns to a person located on the rear seat bench of the vehicle.

The arrangement of the microphone array illustrated in the figure is purely exemplary, and of course quite different configurations, are conceivable, in particular depending on the field of application. It would, for example, also be conceivable to integrate more microphones in the motor vehicle in the region along the dashboard in order to be able to determine the viewing direction of the driver in the normal driving mode even better while he views different areas of the surroundings through the windscreen.

In enclosed spaces, in particular a motor vehicle, it is difficult to determine the location of the speaker and detect the speaking direction owing to reflections of the speech signal at a wide variety of reflective surfaces. It is therefore advantageously appropriate when detecting the speech direction to take into account knowledge about the geometry of the surroundings. It is particularly advantageous here if knowledge about the conditions of the propagation of sound, especially relating to the reflective properties of the objects surrounding the speaker, can be taken into account. Such knowledge may be generated, on the one hand, directly from the structural data of the surrounding area and its known physical parameters, and on the other hand it is also conceivable to access specific standardization data which contains, inter alia, information relating to speech patterns of different persons and/or to different speaking directions. Within the scope of the method according to the present invention it is then also advantageously conceivable to adapt such standardization data while the method is operating. Such an adaptation can be carried out continuously or else also within the scope of an explicitly executed further standardization. For this purpose, within the scope of such a further standardization, speech patterns of different persons and/or speech patterns of at least one person are stored for different speaking directions in accordance with the procedure in a storage unit when the system is originally standardized. It is advantageously possible, for the purpose of further calibration, to modify the storage method here in such a way that if a speech pattern has already been stored in the storage unit for the instantaneously speaking person and/or the instantaneous speaking direction, said speech pattern is not replaced directly but rather only modified in accordance with a suitable algorithm. It is conceivable here for the algorithm to calculate a weighted average from the speech pattern which has already been stored and the new speech pattern.

If the method for the detection of the viewing direction accesses standardization data, the detection power can be significantly increased if the standardization, or else the further standardization is carried out according to fixed rules and specifications to the effect that when the speech patterns are generated, specific words or groups of words, for example, are used or that the speech patterns are generated by speaking in predetermined, preferred speaking directions. In this way, the system can be selectively trained with respect to particularly critical situations. Critical situations are, inter alia, speaking in directions in which, inter alia owing to the reflective characteristics of the surroundings, the speaking direction can only be detected with difficulty, or in which it has to be assumed, with certainty, that the person to be monitored has turned his attention away from the region which he is actually supposed to be observing to the extent that it results in a high risk potential (for example in the situation in which a driver of a vehicle turns to the persons on the rear seats and talks to them). In order to generate the standardization data it is of course not absolutely necessary for the respective speech patterns to be generated by a natural person but rather it is equally conceivable for the speech patterns to be generated synthetically. Within the framework of such a synthesis it is conceivable to connect speech patterns of different persons to one another or else to estimate such data on the basis of theoretical considerations and with knowledge of the structural data of the surroundings of the direction-selective microphone. Use of such synthetic standardization data is especially suitable for a workshop and presetting of the detection system.

Within the framework of the detection of the speaking direction, it is also particularly advantageously possible to use results of the speech evaluation of a communications system, for example of a telephone system, inter alia to reduce the production costs of the device according to the present invention. Communications systems which are suitable for this are, for example, known from German Patent Document No. DE 199 38 171 C2 which describes a system which selectively senses acoustic signals from a plurality of predefined zones of the passenger compartment within a passenger car and passes them on to defined positions/zones within the passenger compartment. In order to sense the acoustic signals, it is also proposed, inter alia, to use microphone arrays. It is then inventively conceivable to configure such a communications system in such a way that, within the scope of the evaluation of the signals of the microphone arrays, the signal processing unit of the communications system supplies a detection result with respect to the speaking direction of a speaker, or else that at least the signals of the microphone arrays are passed on to a separate detection unit.

If the device according to the present invention is connected to backup systems, it is possible, for example when monitoring a driver of a vehicle, to interpret different distraction instances and inattentiveness, and thus output warning signals and information signals of whatever kind to the driver of the vehicle in an adaptive and prompt fashion, which signals considerably support said driver in his driving functions.

It is of course also conceivable to operate the present invention in combination with other sensors (for example cameras or infrared contour detection) in order to also improve the detection capacity further in terms of acquiring more wide ranging knowledge about the person observed. In this way, known systems for issuing warning signals and providing information can be improved further.

The present invention is of course not only restricted to the use for the detection of the viewing direction in a motor vehicle, but can be used to the same degree in any technical fields in which it is necessary to detect and evaluate the viewing direction of persons.

What is claimed is:

1. Method for detecting a viewing direction of a person, the method comprising:
 sensing a speech signal originating from the person using at least one microphone so as to produce a microphone signal;
 detecting the speaking direction of the person using the microphone signal; and deriving the viewing direction from the speaking direction;
wherein the speech signal originates from a driver of a vehicle.

2. The method as recited in claim 1, wherein the sensing is performed using at least one direction-selective individual microphone.

3. The method as recited in claim 1, wherein the sensing is performed using at least one array of a plurality of individual microphones connected to one another.

4. The method as recited in claim 1, wherein the detection of the speaking direction is performed using information related to a geometry of a space surrounding the person and information related to a surrounding condition for propagation of sound.

5. The method as recited in claim 1, further comprising evaluating a speech of the person using a communications system so as to obtain a result, and wherein the detection of the speaking direction is performed using the result.

6. The method as recited in claim 1, further comprising providing first standardization data including speech patterns relating to a plurality of persons, and wherein the detection of the speaking direction is performed using the first standardization data.

7. The method as recited in claim 1, further comprising providing second standardization data relating to a plurality of different speaking directions, and wherein the detection of the speaking direction is performed using the second standardization data.

8. The method as recited in claim 6, further comprising, adapting the first standardization data during one of the sensing and detecting steps according to a changed situation.

9. The method as recited in claim 8, wherein the changed situation includes one of a changed way of speaking and a changed register.

10. The method as recited in claim 1, further comprising storing a speech pattern of at least one person.

11. The method as recited in claim 1, further comprising storing a speech pattern relating to a plurality of different speech directions using a storing device.

12. The method as recited in claim 10, further comprising inputting speech patterns of the person into the storage device so as generate the speech pattern.

13. The method as recited in claim 10, further comprising synthetically generating data by combining speech patterns of a plurality of natural persons and inputting speech patterns of the synthetically generated data.

14. A device for detecting a viewing direction of a person, comprising:
at least one microphone configured to detect a speaking direction of the person using speech signals; and
a processing unit configured to process the speech signals so as to determine the viewing direction of the person;
wherein the person is a driver of a vehicle.

15. The device as recited in claim 14, wherein the at least one microphone includes a direction-selective individual microphone.

16. The device as recited in claim 14, wherein the at least one microphone includes a microphone array of a plurality of individual microphones connected to one another so as to provide direction-selective information.

17. The device as recited in claim 14, further comprising a storage unit containing information related to a geometry influencing conditions of sound propagation and information related to a space surrounding the person being stored in the storage unit.

18. The device as recited in claim 14, wherein further comprising a communications system operatively connected to at least one of the microphone and the processing unit.

19. The device as recited in claim 14, further comprising a storage unit containing standardization data relating to speech patterns of a plurality of different persons.

20. The device as recited in claim 14, further comprising a storage unit containing standardization data relating to a plurality of different speaking directions.

21. The device as recited in claim 19, further comprising an adaptation unit configured to adapt the standardization data according to a changed situation.

22. The device as recited in claim 21, wherein the changed situation includes a change in a way of speaking of the person over time.

23. The device as recited in claim 21, wherein the changed situation includes a change in a register of the speaker over time.

24. The method as recited in claim 1, further comprising evaluating a risk potential for the driver based on the viewing direction.

25. The device as recited in claim 14, wherein the processing unit is configured to evaluate a risk potential for the driver based on the viewing direction.

26. Method for detecting a viewing direction of a vehicle driver, the method comprising:
sensing a speech signal originating from the vehicle driver using at least one microphone so as to produce a microphone signal;
detecting the speaking direction of the vehicle driver using the microphone signal;
deriving the viewing direction from the speaking direction; and
evaluating a risk potential for the vehicle driver based on the viewing direction.

* * * * *